June 7, 1949.    E. M. SPLAINE    2,472,731
ONE-PIECE CHANNELED LENS MOUNTING

Filed Dec. 15, 1944

INVENTOR.
EDWARD M. SPLAINE
BY Louis L. Gagnon
ATTORNEY.

Patented June 7, 1949

2,472,731

UNITED STATES PATENT OFFICE 2,472,731

ONE-PIECE CHANNELED LENS MOUNTING

Edward M. Splaine, Southbridge, Mass., assignor to American Optical Company, Southbridge, Mass., a voluntary association of Massachusetts Application December 15, 1944, Serial No. 568,282

7 Claims. (Cl. 88—41)

This invention relates to improvements in eye protection devices and has particular reference to a device embodying a transparent shield or lens for protecting the eyes from flying particles or the like and which may have embodied therein means for varying and controlling the light transmitted thereby.

One of the principal objects of the invention is to provide a device of the above character which is light in weight, durable and which has its shield or lens supporting parts located above the useful field of vision.

Another object is to provide a device of the above character having its shield or lens portion formed of initially flat sheet plastic material defining two lens portions supported by a reinforcing bar curved to conform substantially to the curvature of the face and being of sufficient rigidity to retain the shield or lens substantially to its curvature when said bar and lens are in asasembled relation with each other.

Another object is to provide a shield or lens supporting bar of the above character to which temples may be connected and having an intermediate thickened portion functioning as brow engagement means for retaining the shield or lens properly spaced relative to the eyes.

Another object is to provide a shield or lens formed of sheet plastic material defining two lens portions having a nasal recess in the lower edge thereof in combination with a nose bearing member having a grooved portion fitted in said nasal recess portion and adapted to receive the adjacent edge of the lens and to be adhesively secured to said lens.

Another object is to provide a reinforcing bar of the above character having a groove longitudinally thereof adapted to receive the edge of the lens and into which the lens is adhesively secured.

Another object is to provide a brace bar of the above character having a channelled portion for reducing the weight thereof.

Another object is to provide a brace bar of the above character having integral perforated lug portions adjacent the opposed ends thereof to which temples may be pivotally connected.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. The invention therefore is not to be limited to the exact details of construction and arrangement of parts shown and described as the preferred form only has been given by way of illustration.

Referring to the drawings.

Figure 1:
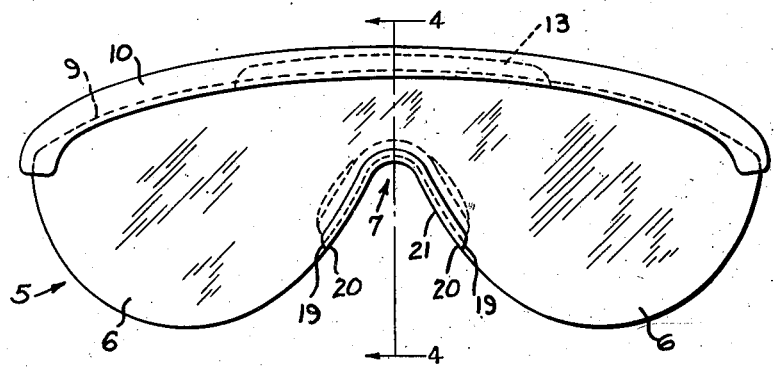
Fig. 1 is a front elevational view of the device embodying the invention.
Figure 2:
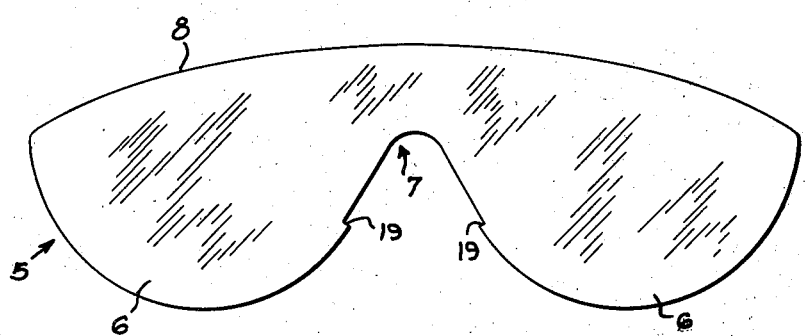
Fig. 2 is a front elevational view of the lens portion.
Figure 3:
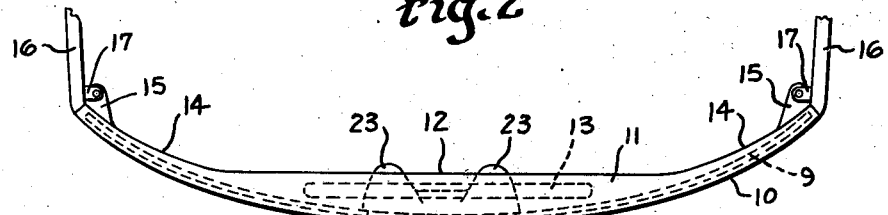
Fig. 3 is a top plan view of the device illustrated in Fig. 1.
Figure 4:
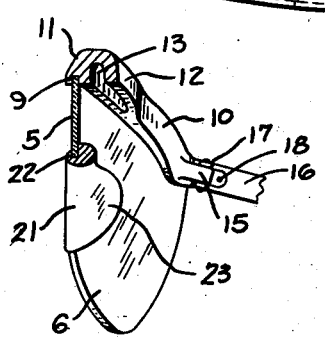
Fig. 4 is a sectional view taken as on line 4—4 of Fig. 1 and looking in the direction indicated by the arrows.

Referring more particularly to the drawings wherein like characters of reference designate like parts throughout the several views, the device embodying the invention comprises a sheet material 5 shaped to provide a pair of integral shield or lens portions 6 and a nasal recess 7 in the lower edge thereof as shown best in Fig. 2. The said integral shield or lens portions 6 are preferably blanked from sheet plastic material, such as cellulose acetate, methyl methacrylate, or any other known transparent artificial resinous materials. The sheet plastic material may be provided with light polarizing characteristics or any other desired light absorbing characteristics or color by using proper light absorbing dyes incorporated within the plastic or artificial resinous material or by incorporating therein means for absorbing in the extra visual regions. The integral shield or lens portion 6 is provided with an upper curved edge 8 adapted to fit within a slot or seat 9 formed longitudinally of a reinforcing bar or support 10. The bar or support 10 may be formed of any suitable material, preferably moldable plastic material, such as for example, cellulose acetate or methyl methacrylate or other known artificial resinous materials or may be formed of cellulose nitrate or the like depending upon the nature of the material used for the shield or lens portion. The sheet material 5 may be secured within the longitudinal slot or seat 9 by means of any suitable cement, adhesive or solvent commonly known in the art or said bar 10 may be integrally molded in position around the edge of the shield or lens portion 6 and thereby connected therewith. The said support or bar 10 is preferably curved substantially to the contour shape of the face and is provided with an intermediate portion 11 of increased thickness having a rear surface 12 for engaging the brow of the wearer when in position of use and being adapted to space the shield or lens portion 6 from the eyes an amount sufficient to clear the eyelashes of the wearer. The said portion 11 of increased thickness, as shown best in Fig. 4, is provided with a slot or channel 13 for decreasing the weight thereof. The said support or bar portion 10 is provided adjacent its opposed ends with portions 14 tapering outwardly from said intermediate portion 11 and terminating in temple lugs 15 preferably formed of the same material as the support or bar 10 either integrally therewith or separately and joined therewith by a suitable cement, solvent or other adhesive. Suitable temples 16 formed of material similar to the support or bar member 10 are secured to the lugs 15 preferably by hinge members 17 either formed of the same material and formed integrally with the temples 16 or formed separately and of metal in which instance the said hinge members are secured to the temples 16 by rivets or the like 18. The sheet material 5, in the vicinity of the nasal recess 7, is provided with shouldered portions 19 adapted to receive the ends 20 of a nose engagement member 21. The said nose engagement member 21 is shaped substantially to the contour shape of the nasal recess 7 and is provided with a slot 22 to receive the edge of the shield or lens portion adjacent said nasal recess. This is best shown in Fig. 4. The said nose engagement member 21 is secured to the shield or lens portion in a manner similar to the support or bar 10 and may be formed of the same materials as set forth for said bar 10. The said nose engagement member 21 is provided with integral pad portions 23 for engaging the opposed sides of the nose, it being understood the said pads are suitably angle for proper and comfortable fit with the nose.

It is particularly pointed out that the shield or lens portions 6 are initially formed of flat material and that when secured within the slot 9 or otherwise attached or connected with the support or bar 10, the said shield or lens portions are curved to fit within said slot and are adapted to be retained substantially to said curvature during the use of the device. The said shield or lens portions may be tinted red, green, or any other desirable color as well as embodying any other absorptive characteristics. While the support or bar member 10 is described as being curved substantially to the contour of the face, the said curvature is also so controlled as to reduce reflection of light incident on the shield or lens portion from a direction rearwardly of the wearer.

The shield or lens portion 6 may be cut, blanked, or otherwise shaped to the contour shape desired from sheet material having the proper characteristics required. In instances when the shield or lens portion 6 is formed of relatively thin material it may be merely bent to the curvature of the bar through the securing thereof within the slot or seat 9 with the bar 10 being solely depended upon for retaining the shield or lens to the desired curvature. In instances when the shield or lens is formed of relatively thick material, the said lens is preferably formed and set substantially to the curvature of the bar 10 and is then secured within the slot or seat 9. In this latter instance, the bar 10, of course, aids in retaining the shield or lens portion 9 to said desired curved shape.

If desired, the bar 10, endpieces 15, shield or lens portion 6 and nose bearing portion 21 may all be formed in integral relation with each other by an injection molding process with the lens portion 6 being treated with suitable dyes or the like for producing the required absorptive characteristics, color, etc. The bar portion 10 may be colored to produce any desired effect by brushing or spraying a suitable dye or the like thereon.

From the foregoing description it will be seen that simple, efficient, and economical means have been provided for accomplishing all the objects and advantages of the invention.

Having described my invention, I claim:

1. An ophthalmic mounting of the character described comprising a bar-like member of relatively rigid material curved substantially to the general contour of the face and having temple connection means adjacent either end, said bar-like member having rearwardly extending means thereon for engaging the brow and having an attachment seat extending longitudinally thereof forming a curve complementary to the curved shape of said bar-like member, a shield-like lens member of transparent material having a nasal recess in the lower edge thereof and having the major portion of its upper contour edge secured in said attachment seat, the rigidity of the bar-like member retaining said lens member to said curvature of the bar-like member, and with the end portions of said bar-like member curving outwardly and rearwardly of the brow engaging means so as to cup the lens member about the face of the wearer, said lens member having shouldered portions adjacent the nasal recess thereof for receiving the ends of a nose engaging member, a nose engaging member having a slotted portion interfitted with the edge of the lens member in said nasal recess and retained against movement by said shouldered portions, said nose engaging member having integral rearwardly extending nose pad portions.

2. An ophthalmic device comprising, in combination, a bar element adapted to extend across the face and above the eyes of the wearer of said device, temple means secured to the ends of said bar for holding said device in position on said wearer, lens means comprising a sheet of transparent organic plastic material shaped to provide a pair of eye portions having a nose recess therebetween, means for securing said lens means to said bar, and nose pad means comprising a yoke element adapted to rest on the nose of the wearer of said device, said yoke element being of substantially the same size and shape as said nose recess in said lens and fitting therewithin, the outside of said yoke element being provided with a groove for receiving the edge of said lens, said nose recess terminating in a pair of shoulders adapted to retain said yoke element within said recess.

3. A supporting structure for a shield type lens member comprising a unitary bar-like member of relatively rigid material, said bar-like member, when viewed from the front, having end portions curving in a downward direction, said end portions having rearwardly extending temple supporting lugs on the rear side thereof, the front surface of said bar-like member being of substantially convex shape curved rearwardly to follow the general curvature of the wearer's face in the vicinity of his eyes, and the rear surface of said bar-like member embodying an intermediate surface section which throughout the major portion thereof is substantially flat, and further having rearwardly curving outer end sections on opposed sides of said intermediate section, said intermediate section being formed to normally lie in a substantially vertical plane which intersects the front curved surface of the bar-like member at points substantially midway between the ends of the bar-like member and a plane tangential to the center of said front surface thereof, said intermediate section joining with the rearwardly curving outer sections of the rear surface of the bar-like member at points spaced inwardly from the ends thereof, with said rearwardly curving outer sections of the rear surface approaching substantially parallelism to the curvature of the front surface and the rearwardly curving portions of the bar-like member having a cross-sectional dimension substantially less than the cross-sectional dimension of the central part of the intermediate portion of said bar-like member, said bar-like member having a channel in its underside extending from adjacent one end thereof to its other end, the sidewalls of said channel being substantially parallel to the curved front surface of the bar-like member for receiving the upper contour edge of an initially flat shield-like lens, and said bar-like member having sufficient rigidity to retain said shield-like lens substantially to said curvature when assembled therewith.

4. A supporting structure for a shield-type lens comprising a unitary bar-like member of relatively rigid material having a front surface of convex shape curved rearwardly substantially to the general curvature of the face in the vicinity of the eyes and having temple supporting lugs adjacent the ends and extending rearwardly thereof, said bar-like member, when viewed from the front, having an intermediate portion curving downwardly along a relatively shallow arc and terminating in end portions which turn in a downward direction with a relatively sharp bend to end surfaces spaced slightly below the lower surfaces of the temple supporting lugs, said bar-like member having a substantially flat rear surface laying in a substantially vertical plane intersecting said front surface at a point substantially midway between a plane tangent with the center of said front surface and the ends of said front surface, the front surface of said bar-like member forming portions tapering outwardly to each side of the center of said front surface and intersecting curved surfaces formed rearwardly of the end portions of said bar-like member at points distant slightly greater than half the length of said bar-like member between the center line and the end thereof, said bar-like member having a channel in the under-surface thereof extending from adjacent one end thereof to adjacent the other end thereof, with the side wall of said channel approaching substantially parallelism to the front surface curvature of said member for receiving the upper contour edge of an initially flat shield-like lens of transparent material its upper edge shaped to be positioned in said channel, said bar-like member having sufficient rigidity for retaining said lens substantially to that of the curvature of the front surface of said bar-like member when assembled therewith, and the bar-like member along a line extending through the center thereof having a cross-sectional dimension substantially twice that of the cross-sectional dimension of the end portions thereof intermediate the front surface curvature nad the outer rear surface curvatures of said portions.

5. A supporting structure for a shield type lens member comprising a unitary bar-like member of relatively rigid material, said bar-like member, when viewed from the front, curving downwardly along a relatively shallow arc to end portions which are turned downwardly therefrom with a relatively sharp bend, and have temples pivotally connected thereto, said bar-like member having a front surface of substantially convex shape curved rearwardly to follow the general curvature of the wearer's face in the vicinity of his eyes, and having a channel in its underside extending from adjacent one end thereof to its other end, the sidewalls of said channel being substantially parallel to said curved front surface of the bar-like member for receiving the upper contour edge of an initially flat shield-like lens, and with the bar-like member being sufficiently rigid to retain said shield-like lens substantially to said curvature when assembled therewith, the intermediate portion of said bar-like member having a cross-sectional dimension substantially twice that of the outer portions of the bar-like portion on opposed sides thereof, said intermediate portion being recessed intermediate its rear surface and the lens receiving channel, with said rear surface of the intermediate portion being substantially flat and lying in a vertical plane intersecting the front curved surface of the bar-like member substantially midway between the ends of the bar-like member and a plane tangential to the center of said front surface, the rear surface of said outer portions of the bar-like member on opposed sides of the intermediate portion being curved rearwardly as a continuation of said flat rear surface of the intermediate portion in substantially parallel relation to the front curvature of the bar-like member.

6. An ophthalmic mounting of the character described comprising a unitary bar-like member of relatively rigid material, said bar-like member, when viewed from the front, curving downwardly along a relatively shallow arc to end portions which are turned downwardly therefrom with a relatively sharp bend, and having temple supporting lugs mounted on the rear side of said end portions slightly above the ends thereof, said bar-like member having a front surface of substantially convex shape curved rearwardly to follow the general curvature of the wearer's face in the vicinity of his eyes, and having a channel in its underside extending from adjacent one end thereof to its other end, with the sidewalls of said channel being substantially parallel to the curved front surface of the bar-like member, and a shield-like lens member of flexible transparent sheet material having its upper edges seated in said channel, said bar-like member having sufficient rigidity to retain said shield-like lens substantially to said convex curved shape, the rear surface of said bar-like member embodying a substantially flat intermediate surface section and rearwardly curving outer end sections on the opposed sides thereof, said intermediate flat section lying in a substantially vertical plane intersecting the front curved surface of the bar-like member substantially midway between the ends of the bar-like member and a plane tangential to the center of said front surface, said intermediate flat section merging with the rearwardly curving outer sections of the rear surface of the bar-like member at points spaced inwardly from the ends thereof approximately a quarter of the overall length of the bar-like member, said rearwardly curving outer sections of the rear surface approaching substantially parallelism with the curvature of the front surface and the rearwardly curving portions of the bar-like member having a cross-sectional dimension of substantially half the cross-sectional dimension of the intermediate portion thereof.

7. An ophthalmic mounting of the character described comprising a unitary bar-like member of relatively rigid material, said bar-like member, when viewed from the front, curving downwardly along a relatively shallow arc to end portions which are turned downwardly therefrom with a relatively sharp bend, and having temple supporting lugs mounted on the rear side of said end portions slightly above the ends thereof, said bar-like member having a front surface of substantially convex shape curved rearwardly to follow the general curvature of the wearer's face in the vicinity of his eyes, and having a channel in its underside extending from adjacent one end thereof to its other end, with the sidewalls of said channel being substantially parallel to the curved front surface of the bar-like member, and a shield-like lens member of transparent material having its upper edges seated in said channel, said lens member embodying a pair of eye portions and a nasal recess in the lower edge thereof intermediate said eye portions, and a yoke-shaped nose rest member fitted in said nasal recess, said nose rest member being of substantially the size and shape of the recess and being grooved on its outer side for receiving the adjacent edges of said lens member, the rear surface of said bar-like member embodying a substantially flat intermediate surface section and rearwardly curving outer end sections on the opposed sides thereof, said intermediate flat section lying in a substantially vertical plane intersecting the front curved surface of the bar-like member substantially midway between the ends of the bar-like member and a plane tangential to the center of said front surface, said intermediate flat section merging with the rearwardly curving outer sections of the rear surface of the bar-like member at points spaced inwardly from the ends thereof approximately a quarter of the overall length of the bar-like member, said rearwardly curving outer sections of the rear surface approaching substantially parallelism with the curvature of the front surface with the rearwardly curving portions of said bar-like member having a cross-sectional dimension of approximately half the cross-sectional dimension of the intermediate portion of said bar-like member.

EDWARD M. SPLAINE.

REFERENCES CITED

The following references are of record in the file of this patent:

UNITED STATES PATENTS

| Number | Name | Date |
|---|---|---|
| 1,238,396 | Elwood | Aug. 28, 1917 |
| 1,544,925 | Nelson | July 7, 1925 |
| 1,805,396 | Havens | May 12, 1931 |
| 1,899,905 | Uhlemann | Feb. 28, 1935 |
| 2,172,959 | Hirtenstein | Sept. 12, 1939 |
| 2,179,286 | English | Nov. 7, 1939 |
| 2,187,810 | Rentz | Jan. 23, 1940 |
| 2,191,937 | Low | Feb. 27, 1940 |
| 2,192,092 | Miller, Jr. | Feb. 27, 1940 |
| 2,337,617 | Miller, Jr. | Dec. 28, 1943 |
| 2,397,243 | Cooper | Mar. 26, 1946 |